United States Patent [19]

Bast et al.

[11] 4,142,914

[45] Mar. 6, 1979

[54] PIGMENTS WHICH ARE STABLE IN NITROCELLULOSE

[75] Inventors: Klaus Bast, Bad Durkheim; Erwin Plankenhorn, Ludwigshafen, both of Fed. Rep. of Germany

[73] Assignee: BASF Aktiengesellschaft, Rheinland-Pfalz, Fed. Rep. of Germany

[21] Appl. No.: 878,914

[22] Filed: Feb. 17, 1978

[30] Foreign Application Priority Data

Feb. 24, 1977 [DE] Fed. Rep. of Germany ......... 2707972

[51] Int. Cl.$^2$ ...................... C09D 11/02; C09D 11/14
[52] U.S. Cl. ................................ 106/288 Q; 106/22; 106/26; 106/177; 106/178; 106/183; 106/186; 106/193 D; 106/193 P; 106/195; 106/289; 106/308 Q; 106/308 F; 106/308 N; 106/309; 260/387
[58] Field of Search ............... 106/308 N, 308 F, 309, 106/288 Q, 289, 193 P, 193 D, 195, 177, 178, 183, 186, 26, 22, 23; 260/387

[56] References Cited

U.S. PATENT DOCUMENTS

| | | | |
|---|---|---|---|
| 2,635,967 | 4/1953 | Gearhart et al. | 106/183 X |
| 3,336,147 | 8/1967 | Mitchell et al. | 106/309 |
| 3,387,983 | 6/1968 | Rast | 106/289 |

FOREIGN PATENT DOCUMENTS 2049379 4/1972 Fed. Rep. of Germany ............. 106/22

*Primary Examiner*—Helen McCarthy
*Attorney, Agent, or Firm*—Oblon, Fisher, Spivak, McClelland & Maier

[57] ABSTRACT

A pigment which is stable in nitrocellulose and comprises at least one trisaminotriarylmethane dye and heteropolyacids based on phosphoric acid, molybdic acid or tungstic acid, the pigment containing from 0.1 to 10% by weight (based on the pigment formulation) of a compound which possesses at least one —N(CH$_2$—COOH)$_2$ group. The pigment may be used for the stable coloration of nitrocellulose-containing printing inks and finishes or of nitrocellulose chips.

4 Claims, No Drawings

PIGMENTS WHICH ARE STABLE IN NITROCELLULOSE

The present invention relates to pigments (lakes) comprising trisamino-triarylmethane dyes and molybdo-phosphoric acid or molybdo-tungsto-phosphoric acid as heteropolyacids.

It has not previously proved possible to manufacture pigments from basic blue dyes and heteropolyacids which are completely stable in nitrocellulose-containing media, e.g. printing inks, and particularly in nitrocellulose chips.

German Pat. No. 2,049,379 discloses stabilizing nitrocellulose-containing finishes and printing inks containing basic dyes, and/or containing lakes of such dyes, by adding oxalic acid and/or its ammonium salts. However, oxalic acid is not an adequate stabilizer, or possible stabilizer, in every case. In fact, on incorporating lakes based on trisamino-triarylmethane dyes and containing oxalic acid into nitrocellulose, the oxalic acid is substantially destroyed. Hence, the resulting pigmented nitrocellulose chips do not have a stable color. They display a detectable greenish tinge after storage for as little as from 4 to 6 weeks at room temperature.

We have found that pigments comprising at least one trisamino-triarylmethane dye and molybdo-phosphoric acid or molybdo-tungsto-phosphoric acid, which heteropolyacids may in addition contain silicic acid, are stable in nitrocellulose if they contain, based on the pigment formulation, from 0.1 to 10% by weight of a compound which possesses at least one

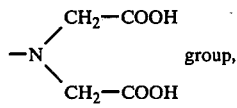

or a mixture of two or more such compounds.

The pigments of the invention show virtually no shade change in nitrocellulose-containing printing inks and finishes, and in nitrocellulose chips, even after storage for from 4 to 6 weeks at 50° C.

Suitable trisamino-triarylmethane dyes are especially those of the formula

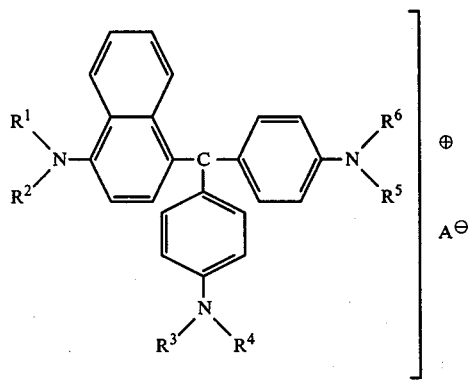

where $A^{\ominus}$ is one equivalent of an anion and $R^1$, $R^2$, $R^3$, $R^4$, $R^5$ and $R^6$ are hydrogen, methyl or ethyl, and $R^1$ may also be substituted or unsubstituted phenyl. Substituted phenyl may above all be alkylphenyl, where alkyl is of 1 to 4 carbon atoms, e.g. p-methylphenyl. Examples of dyes of the formula (I) are C.I. Basic Blue 7, C.I. No. 42,595; C.I. Basic Blue 8, C.I. No. 42,563; C.I. Basic Blue 11, C.I. No. 44,040; C.I. Basic Blue 15, C.I. No. 44,085 and C.I. Basic Blue 26, C.I. No. 44,045.

Suitable heteropolyacids are those based on molybdic acid/phosphoric acid and molybdic acid/tungstic acid/phosphoric acid, which heteropolyacids may in addition contain silicic acid.

Examples of stabilizers to be used according to the invention and containing at least one —N(CH₂—COOH)₂ group (iminodiacetic acid group) are, particularly, nitrilotriacetic acid, ethylenediaminetetraacetic acid, diethylenetriaminepentaacetic acid or mixtures of these.

The stabilizers are preferably used in the form of the salts, preferably alkali metal salts, but also in the form of the ammonium salts. The pigments contain from 0.1 to 10, preferably from 1 to 5, % by weight, based on pigment, of the stabilizers according to the invention.

The pigments according to the invention are obtained if the desired amount of stabilizing agent, advantageously in the form of an alkali metal salt, preferably of the sodium salt, is added to the suspension which is obtained after precipitating the basic dye with the heteropolyacid. The pigment suspension is then worked up in the conventional manner.

Before working up, agents which cover the surfaces of the particles may be added to the suspension, in order to obtain a more easily dispersible pigment after drying.

The pigments thus obtained are universally applicable. They are stable to shade changes in all nitrocellulose-containing finishes and printing inks and in nitrocellulose chips (masterbatches).

The Examples which follow illustrate the invention. Parts and percentages are by weight.

EXAMPLE 1

(a) An aqueous heteropolyacid solution prepared in the conventional manner from 27.0 parts of molybdenum oxide and 2.55 parts of disodium phosphate in 255 parts of water is added to an aqueous solution of 38.6 parts of C.I. Basic Blue 7, C.I. No. 42,595, in 2,700 parts of water, whereupon the blue pigment precipitates. This suspension is stirred for 15 minutes, and 1.74 parts of the sodium salt of nitrilotriacetic acid and 8.3 parts of an emulsion (prepared from 0.53 part of oleic acid ethanolamide, 1.13 parts of normal paraffin of 13 to 15 carbon atoms and 6.64 parts of water at 60° C.) are then added, after which the mixture is stirred for 1 hour. The pigment is isolated and dried.

(b) Printing ink: 8.7 parts of the pigment obtained as described in a) are stirred into 100 parts of a solution comprising 17.5 parts of nitrocellulose NC 400, 20 parts of ethyl acetate, 3 parts of ethylene glycol monoethyl ether and 59.5 parts of ethanol. The printing ink obtained is stored in a closed vessel at 50° C. After 14 days' storage, a sample is knife-coated on to paper and compared with a sample taken before the start of the storage period. The blue shade has not altered. In contrast, the pigment prepared without stabilizer has turned completely green after 14 days' storage at 50° C.

EXAMPLE 2

An aqueous solution of 38.2 parts of C.I. Basic Blue 8, C.I. No. 42,563 in 3,800 parts of water is prepared and precipitated as described in Example 1. 1.74 parts of the sodium salt of ethylenediaminetetraacetic acid are added as the stabilizer.

The color stability is tested as described in Example 1b). The printing ink is unchanged even after 14 days' storage at 50° C.

EXAMPLE 3

An aqueous solution of 38 parts of C.I. Basic Blue 7, C.I. No. 42,595, in 2,700 parts of water is precipitated, as described in Example 1a, with an aqueous heteropolyacid solution. The heteropolyacid solution is obtained from 79.4 parts of molybdenum oxide, 183.6 parts of tungsten oxide and 27.2 parts of disodium phosphate in 1,200 parts of water. 1.89 parts of the sodium salt of diethylenetriaminepentaacetic acid are added as the stabilizer.

Working up is carried out as described in Example 1a). The color stability is tested as described in Example 1b). The blue shade is unchanged even after 14 days' storage.

EXAMPLE 4

24.8 parts of the pigment obtained as described in Example 1, 47 parts of moist nitrocellulose (SA 28 NC-cotton) and 28 parts of a plasticizer based on phthalate esters are kneaded with ethyl acetate in the conventional manner. The kneaded mass is then rolled, after which it is dried at 50° C.

Printing ink: 25 parts of the resulting chips are dissolved by stirring with 75 parts of a mixture of ethanol and ethylene glycol monoethyl ether in the ratio of 9:1, and the batch is diluted with 200 parts of nitrocellulose finish. The shade of the printing ink is unchanged even after 4 weeks' storage at 50° C.

We claim:

1. A pigment which is stable in nitrocellulose and comprises at least one trisamino-triarylmethane dye and molybdo-phosphoric acid or molybdo-tungsto-phosphoric acid (which heteropolyacids may in addition contain silicic acid), and which in addition contains from 0.1 to 10% by weight, based on the pigment formulation, of a compound which possesses at least one —N(CH$_2$—COOH)$_2$ group, said compound being selected from the group consisting of nitrilotriacetic acid, ethylene diaminetetraacetic acid, diethylenetriaminepentaacetic acid, alkali metal salts or ammonium salts thereof, and mixtures thereof.

2. A pigment as claimed in claim 1, which contains from 1 to 5% by weight of compounds which possess at least one —N(CH$_2$—COOH)$_2$ group.

3. A pigment as claimed in claim 1, wherein the carboxyl groups are in the form of the alkali metal salts or ammonium salts.

4. A pigment which is stable in nitrocellulose and comprises at least one trisamino-triarylmethane dye of the formula:

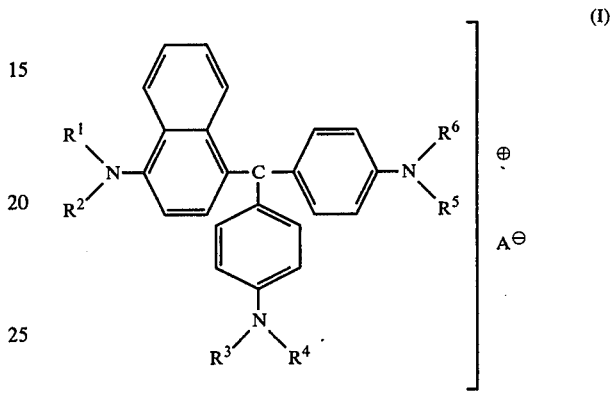

where $A^\ominus$ is one equivalent of an anion and $R^1$, $R^2$, $R^3$, $R^4$, $R^5$ and $R^6$ are hydrogen, methyl or ethyl and the substituents may be identical or different, and $R^1$ may also be phenyl or alkylphenyl (where alkyl is of 1 to 4 carbon atoms), and a heteropolyacid selected from molybdic acid/phosphoric acid or molybdic acid/tungstic acid/phosphoric acid (which heteropolyacids may in addition contain silicic acid), and which in addition contains from 0.1 to 10% by weight, based on pigment, of a compound which possesses at least one —N(CH$_2$COOH)$_2$ group, selected from the group consisting of nitrilotriacetic acid, ethylenediaminetetraacetic acid, diethylenetriaminepentaacetic acid, and mixtures thereof, wherein the carboxyl groups are in the free form or in the form of the alkali metal salts or ammonium salts.

* * * * *